US012245203B2

(12) United States Patent
Novlan

(10) Patent No.: US 12,245,203 B2
(45) Date of Patent: Mar. 4, 2025

(54) RESOURCE COORDINATION INCLUDING FOR FULL-DUPLEX INTEGRATED ACCESS AND BACKHAUL

(71) Applicant: AT&T INTELLECTUAL PROPERTY I, L.P., Atlanta, GA (US)

(72) Inventor: Thomas Novlan, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 102 days.

(21) Appl. No.: 17/237,187

(22) Filed: Apr. 22, 2021

(65) Prior Publication Data

US 2022/0132499 A1  Apr. 28, 2022

Related U.S. Application Data

(60) Provisional application No. 63/104,742, filed on Oct. 23, 2020.

(51) Int. Cl.
*H04W 72/0446* (2023.01)
*H04L 5/14* (2006.01)

(52) U.S. Cl.
CPC .......... *H04W 72/0446* (2013.01); *H04L 5/14* (2013.01)

(58) Field of Classification Search
CPC .... H04W 72/0446; H04L 5/14; H04L 5/0091; H04L 5/16; H04B 7/15542
See application file for complete search history.

(56) References Cited

U.S. PATENT DOCUMENTS 10,021,686 B1 * 7/2018 Oroskar ............ H04W 72/0446
11,438,820 B2   9/2022 Chaponniere et al.
(Continued)

FOREIGN PATENT DOCUMENTS

WO  2021260188 A1  12/2021
WO  2022016473 A1   1/2022
(Continued)

OTHER PUBLICATIONS

Office Action for U.S. Appl. No. 17/237,191 dated Sep. 30, 2022, 37 pages.

*Primary Examiner* — Chirag G Shah
*Assistant Examiner* — Joshua Smith
(74) *Attorney, Agent, or Firm* — Guntin & Gust, PLC; Atanu Das

(57) ABSTRACT

Dynamic frame structure coordination is performed between a parent integrated access and backhaul (IAB) node and child IAB node based on one or more multiplexing options. The parent node sends a dynamic frame structure coordination (DFSC) message to an IAB user equipment function of a child node, indicating that resources are available or released, overriding a semi-statically coordinated and configured downlink/uplink resource pattern. The parent node can make, or the child node can request, the modification. The DFSC message includes multiplexing option(s). The child IAB node's user equipment function communicates the frame structure update to the child node's distributed unit function, which allows the distributed unit function to utilize those resources in accordance with the multiplexing option. Half-duplex, full duplex, frequency division multiplexing and spatial division multiplexing capabilities are considered when selecting the multiplexing option or options for one or more slots identified in the DFSC message.

20 Claims, 15 Drawing Sheets

(56) References Cited

U.S. PATENT DOCUMENTS

| | | | |
|---|---|---|---|
| 2007/0153734 A1* | 7/2007 | Lee | H04B 7/2606 |
| | | | 370/329 |
| 2008/0137584 A1* | 6/2008 | Oh | H04W 72/23 |
| | | | 370/315 |
| 2011/0268016 A1* | 11/2011 | Youn | H04L 5/0003 |
| | | | 370/315 |
| 2011/0317616 A1* | 12/2011 | Seo | H04W 72/1252 |
| | | | 370/315 |
| 2018/0041927 A1 | 2/2018 | Raval et al. | |
| 2020/0052775 A1* | 2/2020 | Nam | H04L 5/14 |
| 2020/0145967 A1* | 5/2020 | Park | H04W 72/042 |
| 2020/0170010 A1* | 5/2020 | Luo | H04W 72/0446 |
| 2020/0221329 A1 | 7/2020 | Kim | |
| 2021/0127368 A1* | 4/2021 | Abedini | H04W 72/044 |
| 2021/0282213 A1 | 9/2021 | Palat et al. | |
| 2022/0039110 A1* | 2/2022 | Takeda | H04W 72/0446 |
| 2022/0078686 A1 | 3/2022 | Yiu | |

FOREIGN PATENT DOCUMENTS

| | | |
|---|---|---|
| WO | 2022022484 A1 | 2/2022 |
| WO | 2022025816 A1 | 2/2022 |
| WO | 2022025818 A1 | 2/2022 |
| WO | 2022071840 A1 | 4/2022 |
| WO | 2022081845 A2 | 4/2022 |
| WO | 2022085601 A1 | 4/2022 |

\* cited by examiner

RESOURCE COORDINATION INCLUDING FOR FULL-DUPLEX INTEGRATED ACCESS AND BACKHAUL

CROSS-REFERENCE TO RELATED APPLICATION

This application is a non-provisional of pending U.S. Provisional Patent Application No. 63/104,742, filed on Oct. 23, 2020 entitled "RESOURCE COORDINATION FOR FULL-DUPLEX INTEGRATED ACCESS AND BACKHAUL." The entirety of the aforementioned application is hereby incorporated herein by reference.

TECHNICAL FIELD

The subject application is related to wireless communication systems, and, for example, to coordination of resources for integrated access and backhaul, and related embodiments.

BACKGROUND

Due to the larger bandwidth available for New Radio (NR, e.g., in the mmWave spectrum) compared to LTE along with the native deployment of massive MIMO (Multiple-Input Multiple-Output) or multi-beam systems in NR, integrated access and backhaul (IAB) links can be developed and deployed. This may, for example, allow easier deployment of a dense network of self-backhauled NR cells in a more integrated manner by building upon many of the control and data channels/procedures defined for providing access to user equipment (UE). In general, IAB nodes (e.g., nodes B and C) multiplex access (mobile terminal/e.g., user equipment) and backhaul (distributed unit/e.g., access point) links in time, frequency, and/or space (e.g., beam-based operation), to relay user traffic to a donor or parent IAB node (e.g., a node A), and vice-versa.

An IAB relay node is part of a multiple hop (multi-hop) topology, and has a user equipment function and a distributed unit function. For mmWave frequencies which typically use time division duplexing (TDD), a practical scenario for IAB deployments is to enforce a half-duplex constraint at the relay. This half-duplex constraint and the multi-hop topology of IAB, results in a staggered frame structure, and has more latency than full-duplex IAB.

In addition, traffic over the backhaul network can be dynamically varying, and usage of different DL/UL frame structure patterns on different hops can result in cross-link interference (CLI), even though static or semi-static signaling or configuration mechanisms are used. The management of CLI is significant for full duplex IAB nodes, because in many cases the interference source is the IAB node itself, whether the distributed unit function or user equipment function.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
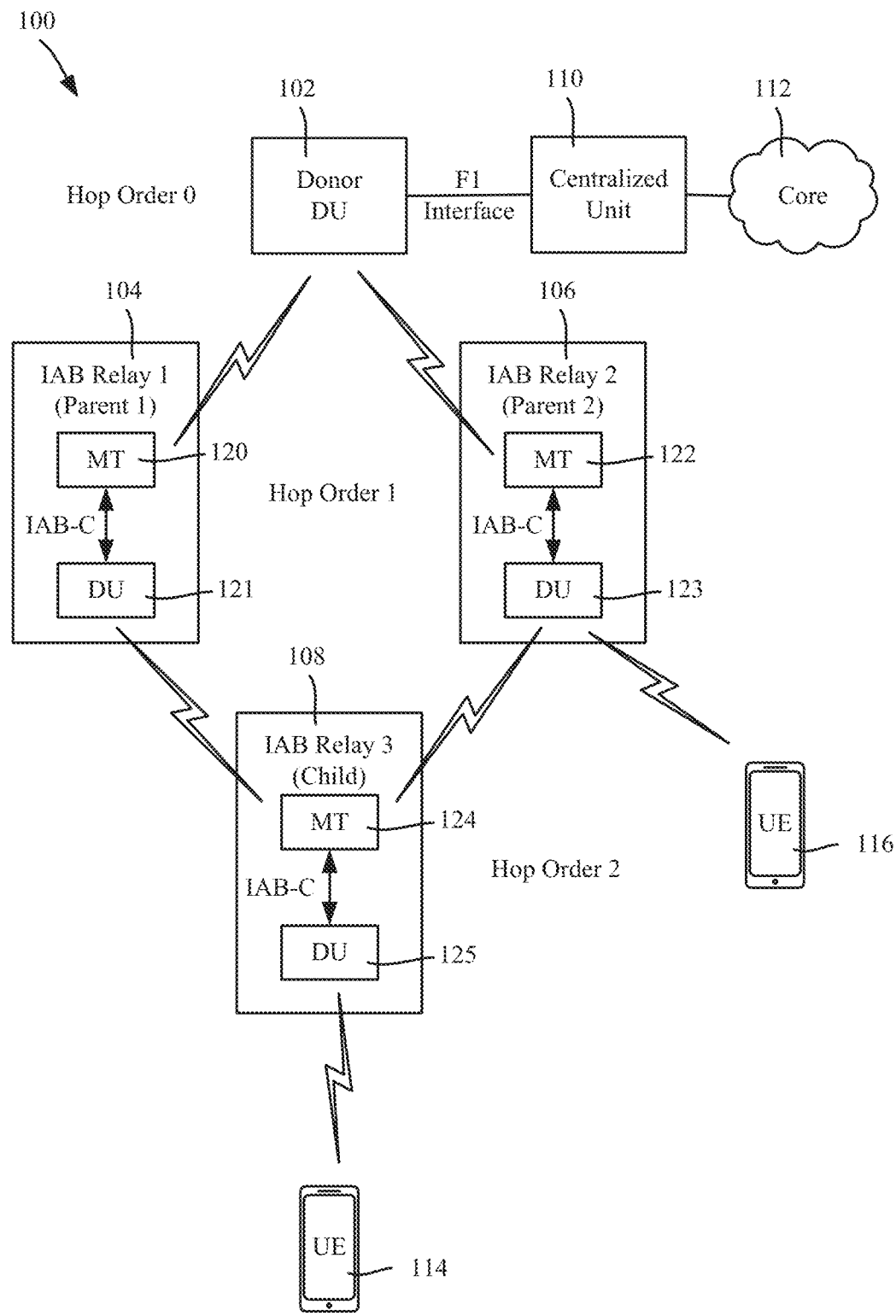
FIG. 1 illustrates an example wireless communication system in which integrated access and backhaul (IAB) nodes are hierarchically arranged, including with a child IAB node configured for dynamic frame schedule coordination, in accordance with various aspects and embodiments of the subject disclosure.

Various aspects of the technology described herein are directed towards performing dynamic resource coordination to support layer 2-based relaying for integrated access and backhaul (IAB), including in 5G NR networks and beyond. Aspects describe how an IAB node and a serving parent node can multiplex downlink and uplink (DL/UL) resources used for access and backhaul links in a full duplex manner, including dynamically and with over-the-air signaling.

As will be understood, in one aspect an IAB parent node and a child IAB node perform dynamic frame structure coordination (DFSC), by which the parent node can indicate to the IAB UE function of the child node that a set of resources are available or released, overriding the semi-statically coordinated and configured DL/UL resource pattern. The IAB UE function indicates the dynamic update of the frame structure to the IAB UE function, which enables the IAB DU function to utilize those resources.

It should be understood that any of the examples and terms used herein are non-limiting. For instance, the examples are based on New Radio (NR, sometimes referred to as 5G) communications between a user equipment exemplified as a smartphone or the like and network device; however virtually any communications devices may benefit from the technology described herein. Thus, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device or simply "network device" is used herein. These terms may be used interchangeably, and refer to any type of network node that serves user equipment and/or connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used. It refers to any type of wireless device that communicates with a radio network node in a cellular or mobile communication system. Examples of user equipment are target device, device to device (D2D) user equipment, machine type user equipment or user equipment capable of machine to machine (M2M) communication, PDA, Tablet, mobile terminals, smart phone, laptop embedded equipped (LEE), laptop mounted equipment (LME), USB dongles etc.

Some embodiments are described in particular for 5G new radio systems. The embodiments are however applicable to any radio access technology (RAT) or multi-RAT system where the user equipment operates using multiple carriers e.g. LTE FDD/TDD, WCMDA/HSPA, GSM/GERAN, Wi Fi, WLAN, WiMax, CDMA2000 etc.

The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception. Note that the solutions outlined applies for Multi RAB (radio bearers) on some carriers (that is data plus speech is simultaneously scheduled).

FIG. 1 illustrates an example wireless communication system 100 comprising a multiple hop (multi-hop) integrated access and backhaul network in accordance with various aspects and embodiments of the subject technology. As shown in FIG. 1, the design of a multi-hop IAB network in 3GPP is based on a hierarchical concept that allows use of existing access downlink (DL) and uplink (UL) procedures and channels to create a multi-hop network. This is arranged by having a donor node 102 (at hop order 0), comprising a distributed unit, be a hierarchical parent to IAB relay nodes 104 and 106 (at hop order 1), which are parents of a child relay node 108 (at hop order 2) and so on. The donor node 102 is coupled via an F1 interface to a centralized unit (CU) 110 and the core 112. Note that FIG. 1 is only one example hierarchical IAB configuration, and, for example there can be a greater number or lesser number of hop orders.

To act as an IAB link, each relay node is configured with a mobile UE function (alternatively referred to and shown in FIG. 1 as an MT (mobile termination) function) and a gNB (gNodeB) or distributed unit (DU) function (IAB-DU) at each relay. The MT function is used for communicating with the parent node(s), whereas the IAB-DU function is used for communicating with the child nodes and/or a UE 114 (or 116). The IAB-MT function and the IAB-DU function internally coordinate/communicate using a control plane interface (IAB-C). Thus, for example, the donor distributed unit 102 is coupled to the mobile termination function/component 120 of IAB node 1 104 and to the mobile termination function/component 122 of IAB node 2 106. The distributed unit function 121 of IAB node 1 104 is coupled for uplink and downlink communications to the mobile termination function 124 of IAB node 3 106. The distributed unit function 123 of the IAB node 106 is coupled for uplink and downlink communications to the mobile termination function 124 of IAB node 3 106, and to the user equipment (UE) 116. The distributed unit function 125 of IAB node 3 108 is coupled for uplink and downlink communications to the user equipment 114.

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

An advantage of IAB is that backhaul and access are integrated and multiplexed in the scheduler, allowing dynamic resource allocation between the backhaul and access links (in both downlink and uplink directions). As a result, the duplex constraint at the relay that prevents simultaneous transmission and reception is a factor when considering how to multiplex access and backhaul links This consideration can become more significant when supporting multiple hops of backhaul links, each with a similar duplex constraint.

Figure 2A:
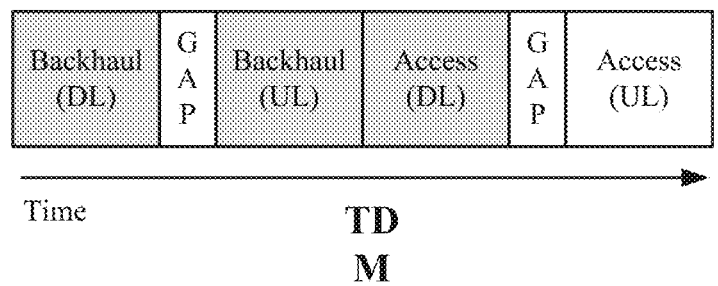
FIGS. 2A and 2B illustrate time division multiplexing and frequency division multiplexing, respectively, of access and backhaul links, in accordance with various aspects and embodiments of the subject disclosure.
Figure 2B:
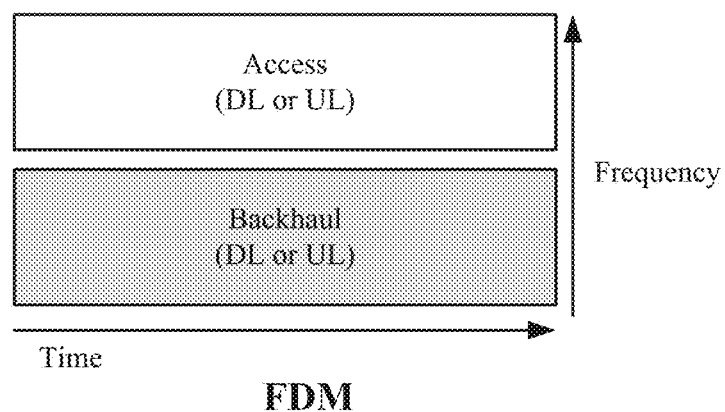

FIGS. 2A and 2B show time-division-multiplexing (TDM, FIG. 2A)/frequency division-multiplexing (FDM, FIG. 2B) of access and backhaul links In FIG. 2A, TDM partitioning is shown with downlink/uplink switching gaps between both the backhaul directions as well as for the access links In the case of FDM, as shown in FIG. 2B, a guard band is introduced between backhaul subframes.

Furthermore, the native deployment of massive MIMO systems in NR also allows supports a complementary multiplexing technique of spatial reuse (e.g., spatial division multiplexing, or SDM) between the backhaul and access links. Thus, for example, while still assuming a half-duplex constraint, it is possible that the uplink access traffic can be received while simultaneously receiving the backhaul traffic from other nodes. Likewise, the downlink access traffic can be served by one node while also transmitting backhaul/relay traffic to other nodes. Depending on the backhaul frame structure and support for beamforming, the access and backhaul traffic can be transmitted using orthogonal resources or by multi-user MIMO transmission schemes.

Figure 3A:
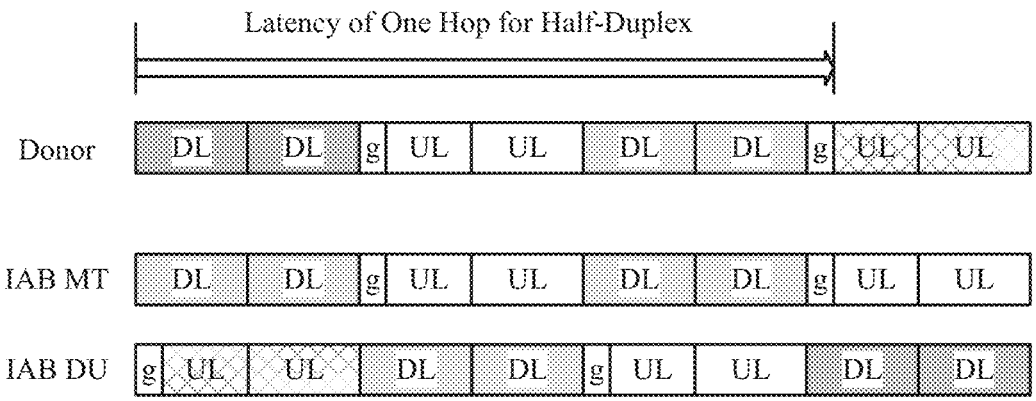
FIGS. 3A and 3B illustrate representations of an example half-duplex frame structure and an example full- half-duplex frame structure, respectively, in accordance with various aspects and embodiments of the subject disclosure.
Figure 3B:
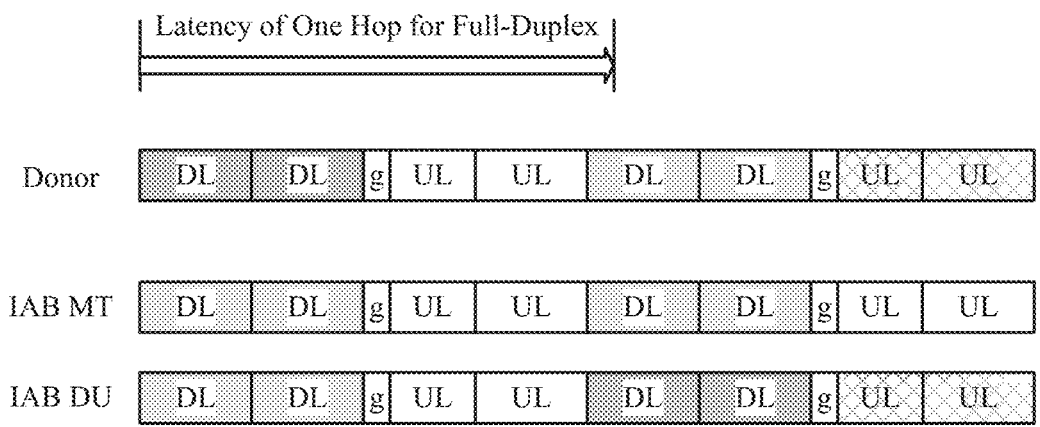

This half-duplex constraint and the multi-hop topology of IAB results in a staggered frame structure as shown in FIG. 3A (where the blocks labeled with lowercase "g" each represent a gap). In contrast, FIG. 3B shows an IAB frame structure with full duplex. As can be seen, one advantage of full-duplex IAB (FIG. 3B) is decreased latency relative to half duplex (FIG. 3A). For example, with full duplex, when the donor DU (hop 0) sends downlink (DL) transmissions to the IAB node MT of hop order 1, the IAB node is receiving, hence it can schedule access UEs or child IAB nodes in the DL or uplink (UL). Alternatively, an IAB node MT of hop order 2 can transmit to the first order IAB node DU when the first order IAB node is receiving from the donor.

Because traffic over the backhaul network can be dynamically varying, and usage of different DL/UL frame structure patterns on different hops can result in cross-link interference (CLI), it can be beneficial to adapt the frame structure of a given access or backhaul link at an IAB node on a dynamic basis as described herein, rather than using static or semi-static signaling or configuration mechanisms. As set forth herein, the management of CLI is needed for full duplex IAB nodes, because in many cases the interference source is the IAB node itself (the DU and/or MT function). Thus, described herein is coordination within an IAB node and across neighboring IAB nodes, which in general results in the access and backhaul links operating with more desirable performance.

Figure 4:
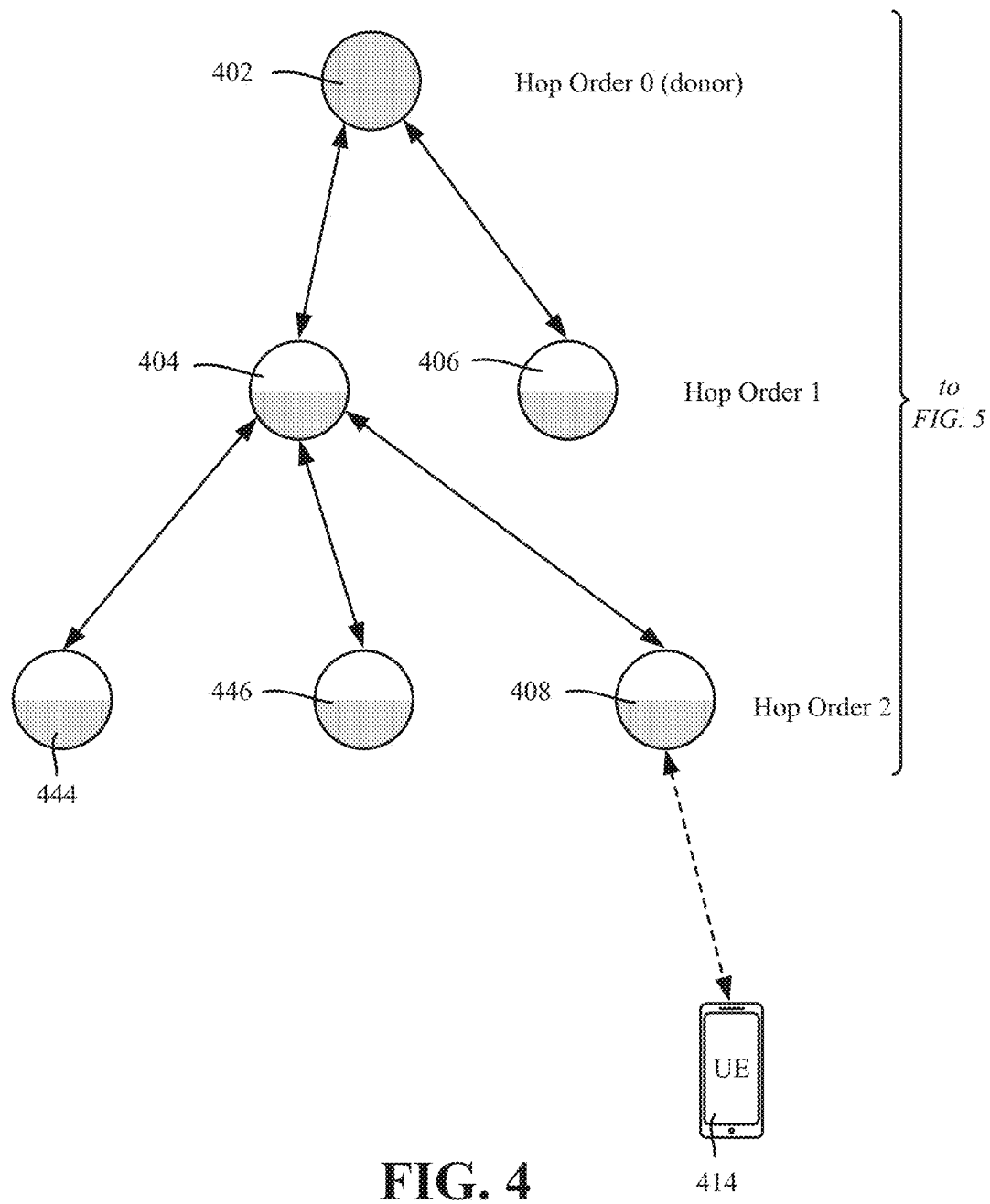
FIGS. 4 and 5 illustrate an example IAB frame structure, in accordance with various aspects and embodiments of the subject disclosure.
Figure 5:
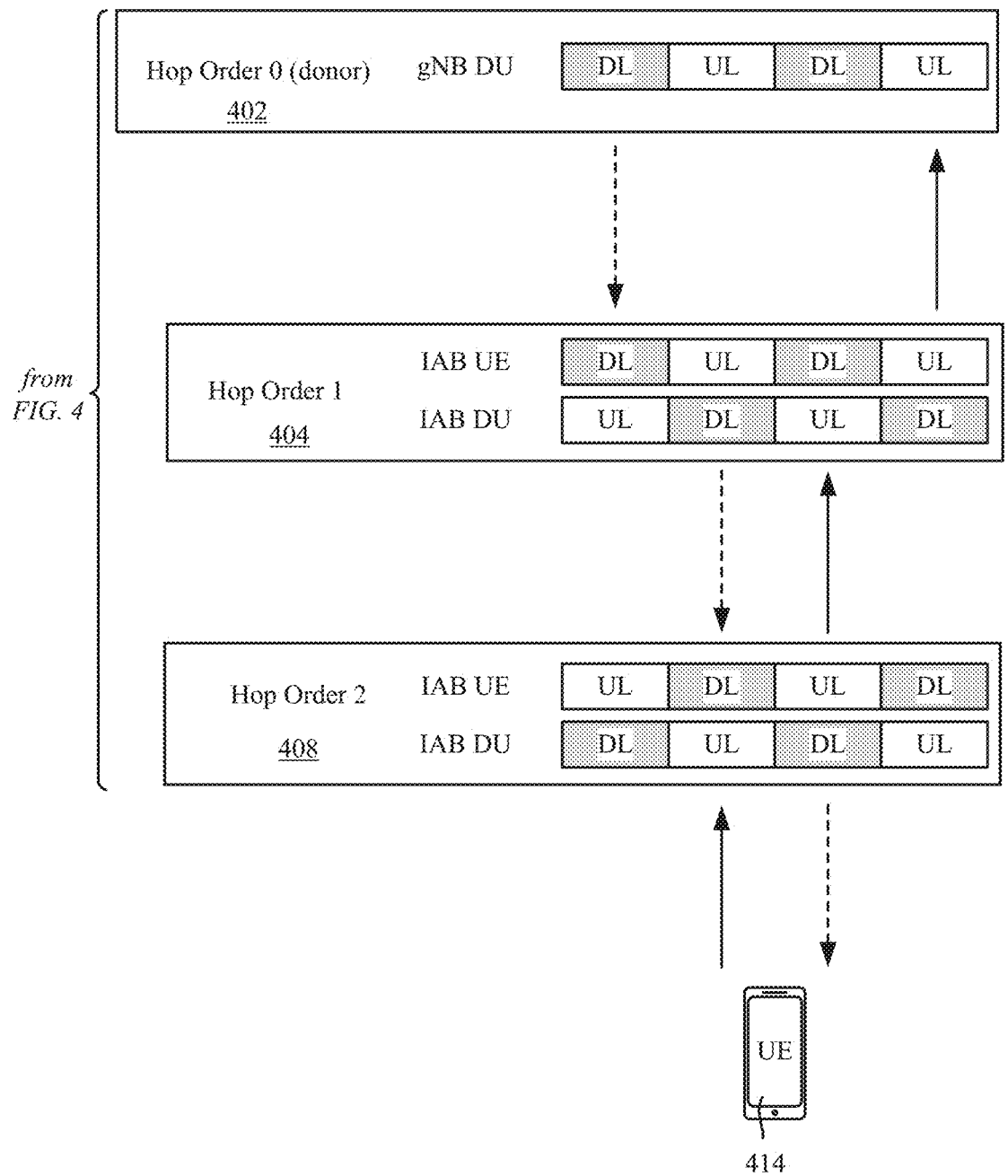

There can be different time/frequency partitions between the access and backhaul links Further, when considering extending the frame structure design to support multi-hop topologies as depicted in the example IAB frame structure of FIGS. 4 and 5, when the donor gNB 402 (hop 0) sends downlink (DL) transmissions to the relay node 404 of hop order 1, the relay node 404 is receiving, hence it can schedule its access UEs (whose gNB/DU it is) in the uplink (UL), e.g., UE 414. Alternatively, a second order relay node 408 can transmit to a first order relay node 404 when the first order relay node 404 is receiving from the donor node 402 (hop order 0). The frame structure can be semi-statically coordinated across the IAB nodes via centralized or distributed coordination mechanisms.

In centralized coordination, one node determines the DL/UL frame structure for the relay nodes in the hops orders. For example the DL/UL frame structure can be semi-statically configured based on the hop order using RRC (radio resource control) signaling from the parent/donor IAB node to IAB node UE function, which internally coordinates using a control plane interface (IAB-C) to inform the IAB DU function of the desired frame structure pattern. In another alternative, the DL/UL frame structure may be provided to the DU function via F1/OAM (F1 interface or operation and management) messages over higher layer control plane signaling, which can be routed over one or more backhaul hops from a central unit (CU) or RAN (radio access network) controller. In yet another alternative, the frame structure is provided by an anchor carrier (e.g. LTE or sub 6 GHz NR carrier) in case of non-standalone (NSA) operation for IAB nodes.

In distributed coordination, each node only determines the DL/UL frame structure for the relay nodes that are connecting to that node. With the relay nodes of each hop order determining the DL/UL frame structure for relays connecting to it, the DL/UL frame structure is determined for the whole topology. The coordination message signaling can be based on higher layer signaling, including system information broadcast, RRC from the parent node, or signaled via another carrier (e.g. via LTE or NR anchor carrier).

However, for both centralized and distributed coordination, depending on traffic load variations or radio measurements including RSRP (reference signal received power) or CLI (cross link interference) measurements, the available DL/UL resources shared between access and backhaul links at a given IAB node may be dynamically optimized/made more optimal, as described herein.

Figure 6:
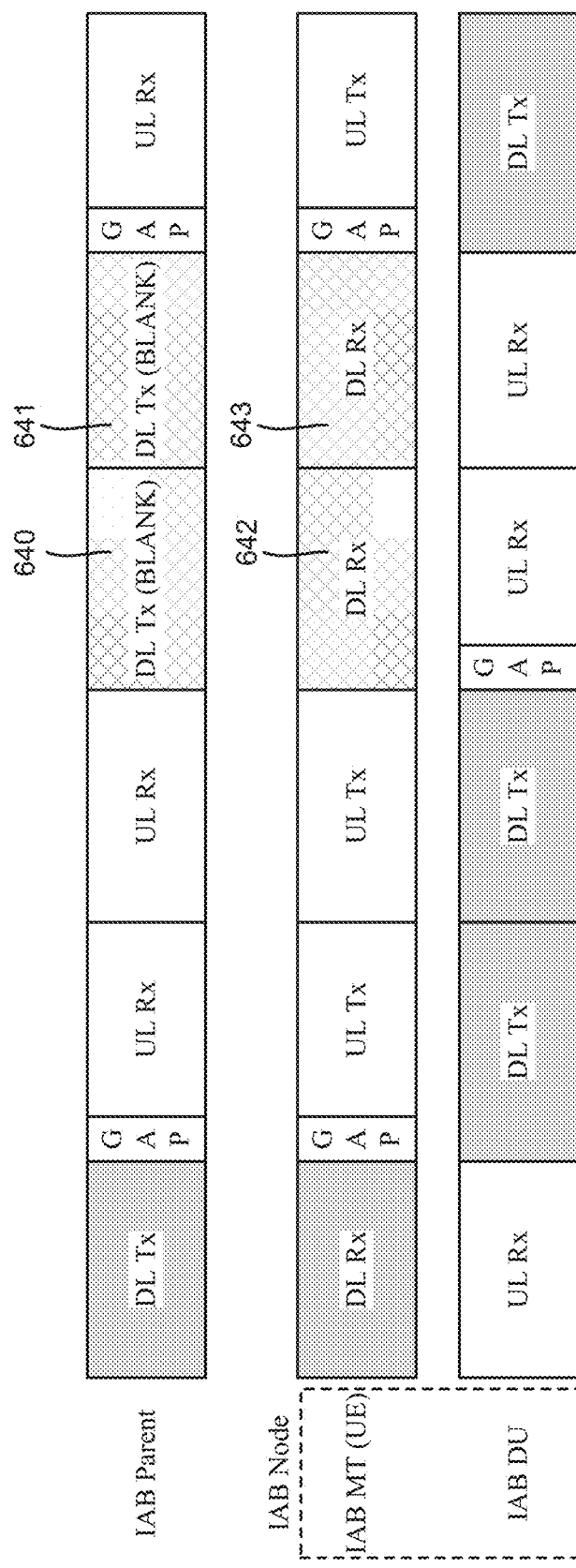
FIG. 6 is representation of an example IAB semi-static frame structure without resource coordination, in accordance with various aspects and embodiments of the subject disclosure.

By way of example, consider FIG. 6 (illustrating an IAB frame structure based on scheduling data prior to any dynamic coordination), in which the downlink communications (shaded blocks) and uplink communications (unshaded blocks) generally alternate to ensure the half-duplex constraint is maintained at the IAB node. In other words, the IAB node is never receiving and transmitting at the same time. In FIG. 6, the DL and UL alternates to ensure the half-duplex constraint is maintained at the IAB node, however during slot t+1 and slot t+2, (in the subframes 640 and 641) the IAB parent node does not have any DL traffic (e.g. relay traffic) to schedule for the IAB node's UE function. Because in FIG. 6 the frame structure is semi-statically coordinated, the IAB DU cannot adapt the frame structure to allow DL transmissions (to access UEs or other IAB nodes) because it is not aware of the potential scheduling of the IAB parent node; thus, the subframes 642 and 643 are reserved to await potential download transmissions, which do not occur.

Figure 7:
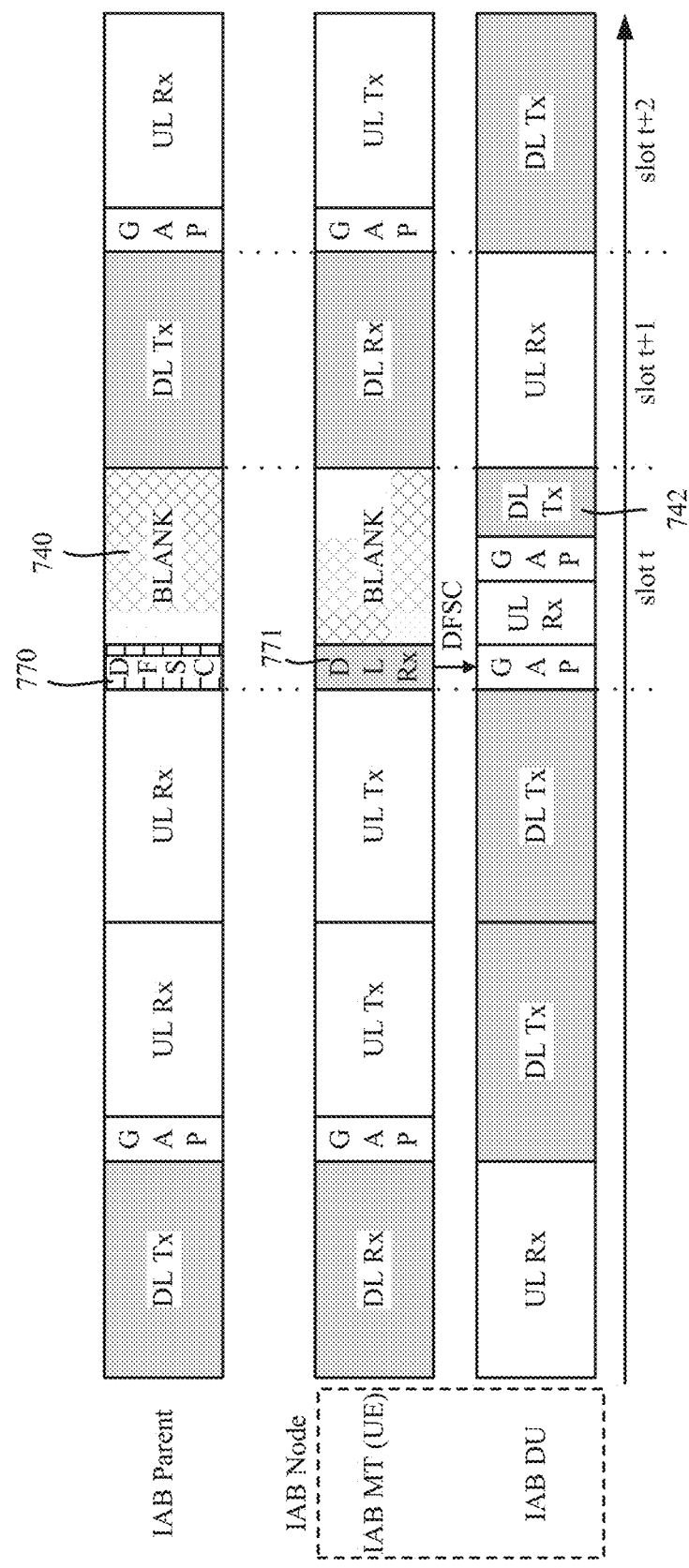
FIGS. 7-10 are representations of various example IAB frame structures modified via dynamic frame structure coordination by use of one or more multiplexing options, in accordance with various aspects and embodiments of the subject disclosure.
Figure 8:
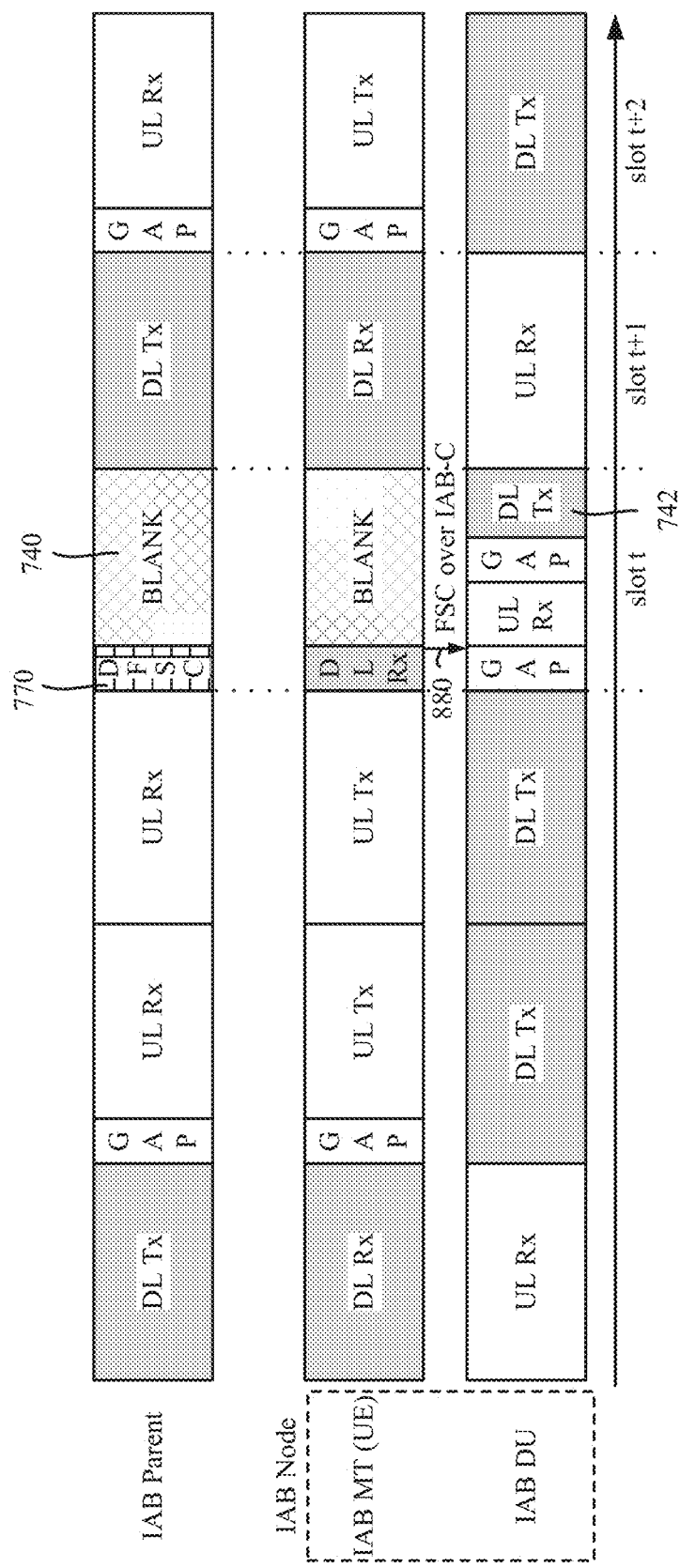

However, as described herein, if the IAB parent and IAB child node can perform dynamic frame structure coordination (DFSC), the parent node can indicate to the child node's IAB UE function that a set of resources are available or released, overriding the semi-statically coordinated and configured DL/UL resource pattern. For example, FIG. 7 shows a DFSC 770 transmitted by a parent node indicating that the parent node is not transmitting in the block 740. The DFSC is received as a downlink reception (block 771) by the child IAB node's UE function, which passes the information to the IAB DU function. For example, the IAB UE can then use the IAB-C (e.g., 880, FIG. 8) to indicate the dynamic update of the frame structure to the IAB DU function to enable the IAB DU to utilize those resources. In the example of FIGS. 7 and 8, the IAB DU function is able to send a downlink transmission (block 742) because of the dynamic frame structure coordination.

One example of DFSC signaling is the usage of a slot-format indicator (SFI) or soft resource availability indicator (AI) in a downlink control information (DCI) message from the parent IAB node to the child IAB UE, which indicate via a bitmap or the like which slots, starting from a reference slot where the DFSC indication is received, are available for the child IAB node to utilize in a flexible manner.

In addition, a DFSC signal can be used for requesting resources to be reserved for DL/UL transmission by the IAB node or the parent node. In one alternative, the requesting node can utilize the resources after receiving an acknowledgment from the target node. In another alternative, the target node may send a rejection indication of the resource request, or may send an updated DFSC with a subset of available resources from the set of request resources.

If the parent and/or child IAB nodes only utilize time-division multiplexing, the availability indicator provided by the DFSC signaling and the decision to utilize the indicated soft resources can be a binary 'yes' or 'no,' because the resource can only be used by one of the two nodes. However, in the case of advanced multiplexing techniques such as SDM/FDM or full duplex as described herein, the indicated resources may be used by both the child and parent, depending on the multiplexing capabilities and different relevant factors and/or one or more criteria such as interference conditions, scheduling metrics, DL/UL power control, and transmit/receive beamforming.

As a result there is a need to differentiate the availability based on different multiplexing options. For example the table below sets forth possible multiplexing options between the parent and child node:

TABLE 1

Parent/Child DFSC + Multiplexing options

| Multiplexing Option | Parent node | Child node |
|---|---|---|
| 1 | DL Tx | MT: DL Rx, DU: Blank |
| 2 | DL Tx | MT: DL Rx, DU: DL Tx |
| 3 | DL Tx | MT: DL Rx, DU: UL Rx |
| 4 | Blank | MT: Blank, DU: Blank |
| 5 | Blank | MT: Blank, DU: DL Tx |
| 6 | Blank | MT: Blank, DU: UL Rx |
| 7 | UL Rx | MT: UL Tx, DU: Blank |
| 8 | UL Rx | MT: UL Tx, DU: DL Tx |
| 9 | UL Rx | MT: UL Tx, DU: UL Rx |

Note that the same DFSC can indicate the availability indicator and multiplexing (AI+Mux) for one slot or for multiple slots. The following Table 2 is an example of a DFSC as described herein; (note that resource availability can be implicitly jointly indicated by the multiplexing option itself, but in this example it is explicit):

TABLE 2

Example DFSC

| Slot index | t | t + 1 | t + 2 |
|---|---|---|---|
| Availability indication | Y | Y | Y |
| Multiplexing option | 4, 5, 6 | 3 | 8 |

FIGS. 7 and 8 thus illustrate a scenario where in available slots, the DFSC indication is different based on the multiplexing option. In slot t, the parent node provides a DFSC indication 770 to the child node which is processed by the IAB UE (MT) function and passed to the IAB DU function. In slot t, the parent determines to not transmit (blank resource, represented by block 740) and indicates this in the DFSC 770 as available slot resources along with multiplexing options 4, 5, and 6. This indicates to the child node that time-division multiplexing operation is to be maintained (only the child MT or DU can be operating) in the slot.

In the next slot, t+1, the IAB parent node indicates (e.g., in the same DFSC indication 770, such as in example Table 2) resource availability along with multiplexing option 3. This indicates to the child node that half-duplex operation should be maintained (only receive or transmit within the IAB node), but spatial (e.g., SDM) multiplexing is allowed—in this case because the IAB UE is receiving DL, the IAB DU can also be receiving UL in the same slot.

In the final t+2 slot of the example DFSC 770, the resource availability is indicated by the parent node along with multiplexing option 8. This indicates to the child node that full-duplex operation can be enabled (both Rx and Tx within the IAB node), in this case because the IAB UE is transmitting in the UL, the IAB DU can also transmit in the DL.

In one alternative the DFSC plus multiplexing indication provides only one combination of resource availability and multiplexing capability to the child IAB node at a given time (e.g. only one row of the above Table 1). In another alternative, the DFSC plus multiplexing indication can provide multiple combinations of resource availability and multiplexing (e.g. multiple rows of the above Table 1) for a given slot/resource.

The availability and multiplexing indications may be provided by joint or independent bitmaps in the same or separate DCI messages. In one alternative, the DCI messages carrying the availability and multiplexing indications can be the same format. In another alternative the DCI messages carrying the availability and multiplexing indications can be different formats. In yet another alternative, the availability indications may be provided on a group-common basis to multiple IAB nodes, while the multiplexing indications can be provided on an IAB node-specific basis. In another alternative, the availability indications may be provided on an IAB-node specific basis, while the multiplexing indications can be provided on a group-common basis to multiple IAB nodes.

In one alternative, the availability indication may be provided on a slot-by-slot basis within a single DFSC, while a single multiplexing indication may be valid for the entire DFSC or subset of the DFSC comprising multiple slots (as in Table 2). This may be beneficial to reduce signaling overhead in the case that the multiplexing capability does not change on the same frequency as the resource availability itself and is semi-persistent. In one alternative, the semi-persistent multiplexing indication can be provided jointly or independently from the availability indication in one or more DCI messages/formats. In another alternative the semi-persistent multiplexing indication can be provided via a Media Access Control (MAC) control element (CE). In another alternative, the semi-persistent multiplexing indication can be configured by higher-layer signaling (e.g. RRC, F1, or OAM messages). The semi-persistent multiplexing indication may be given with a time-domain pattern or window for validity (e.g. valid for the next 40 milliseconds) or may be indicated with a given applicability criteria (e.g. a certain beam pair is selected for either Tx/Rx or CSI/CLI measurements that are above/below a given threshold) or may be activated/deactivated by control signaling (e.g. DCI or MAC CE).

Note that while the above description has primarily focused on the usage and indication of time domain resources, the technology can additionally be applied to frequency domain resources (which can include resource blocks, groups of resource blocks, bandwidth parts, component carriers, or frequency bands) or spatial domain resources (e.g. cell or UE specific beamforming).

Figure 9:
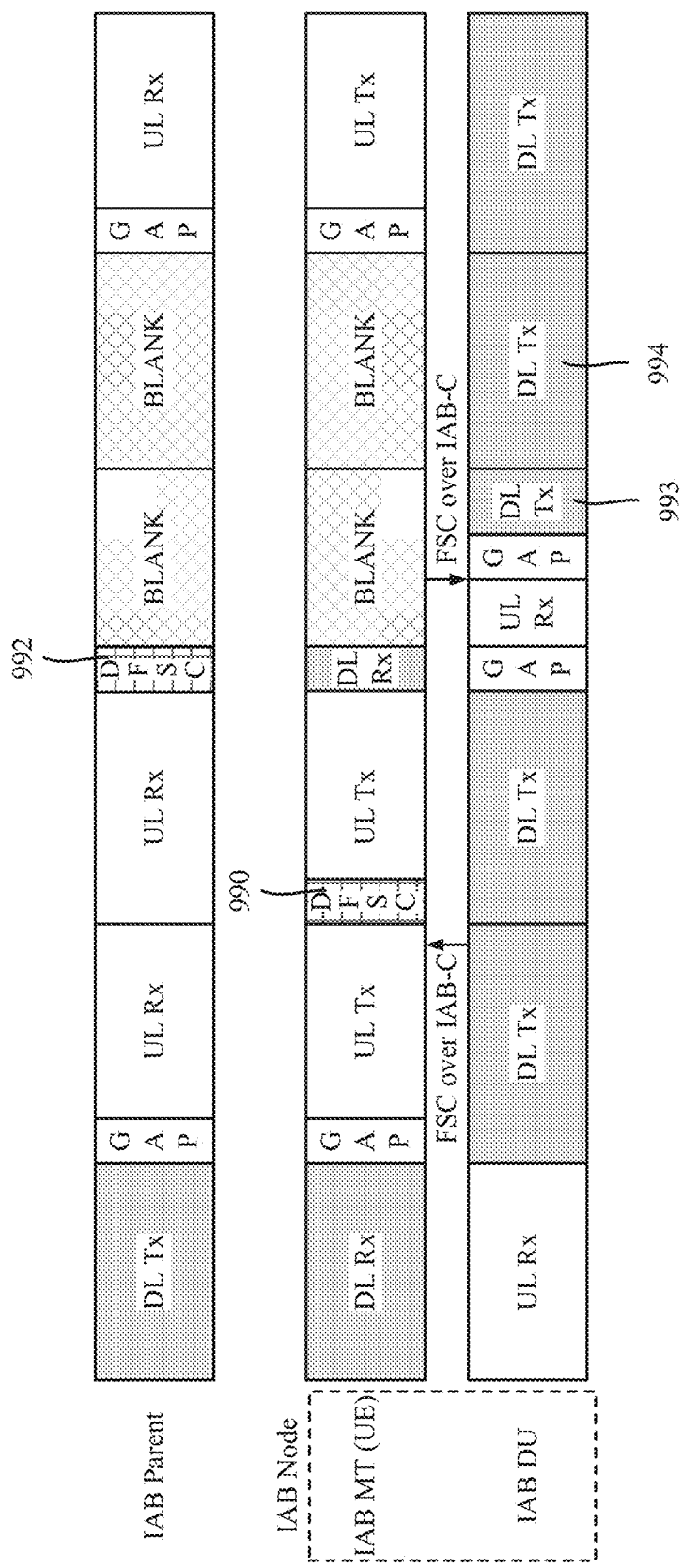

As set forth above, a DFSC signal can be used for requesting resources to be reserved for DL/UL transmission by the IAB node or the parent node. In the example of FIG. 9, the child node's IAB DU requests frame structure coordination via IAB-C to the IAB MT function, which sends a DFSC 990 to the parent node. As described above, the parent node can respond with an affirmative acknowledgement or rejection, and/or can respond with a DFSC 992, which is obtained by the IAB node's MT function and then passed via IAB-C communication to the IAB DU function. In the example of FIG. 9, the changed frame structure allows the IAB-DU to downlink transmit at the times represented by the blocks 993 and 994.

Figure 10:
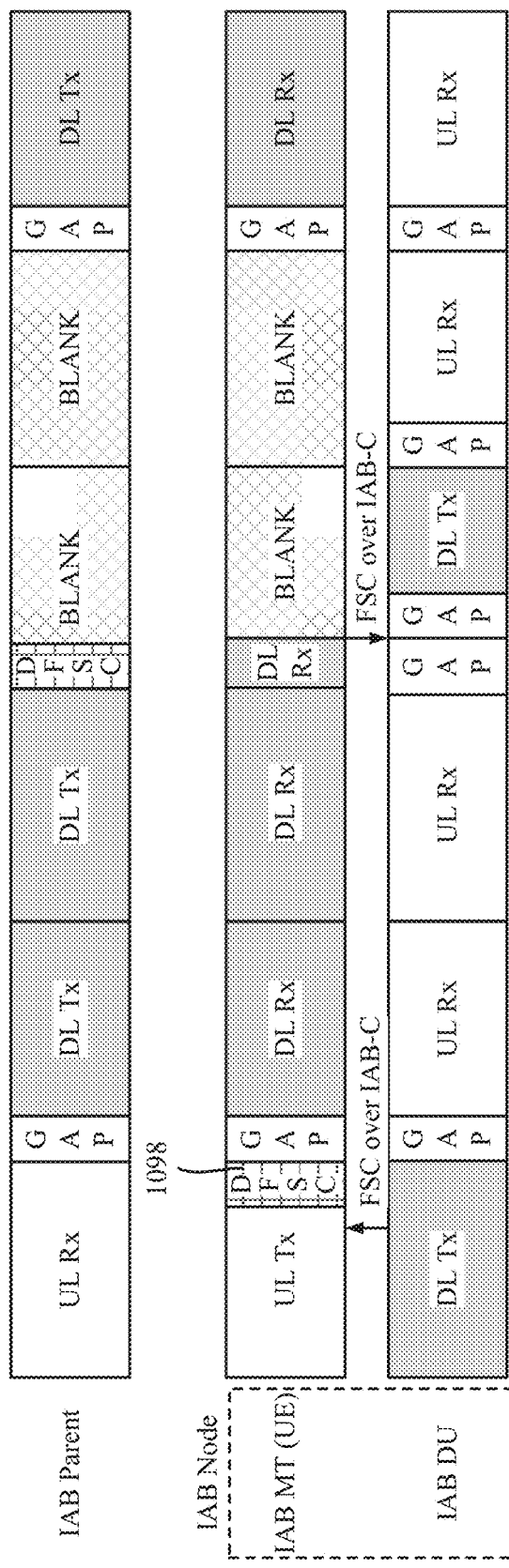

FIG. 10 shows a similar DFSC request 1098 sent to the parent node. In this example, the frame structure is modified according to the request, and the IAB child node can receive and transmit according to the changed frame structure.

Figure 11:
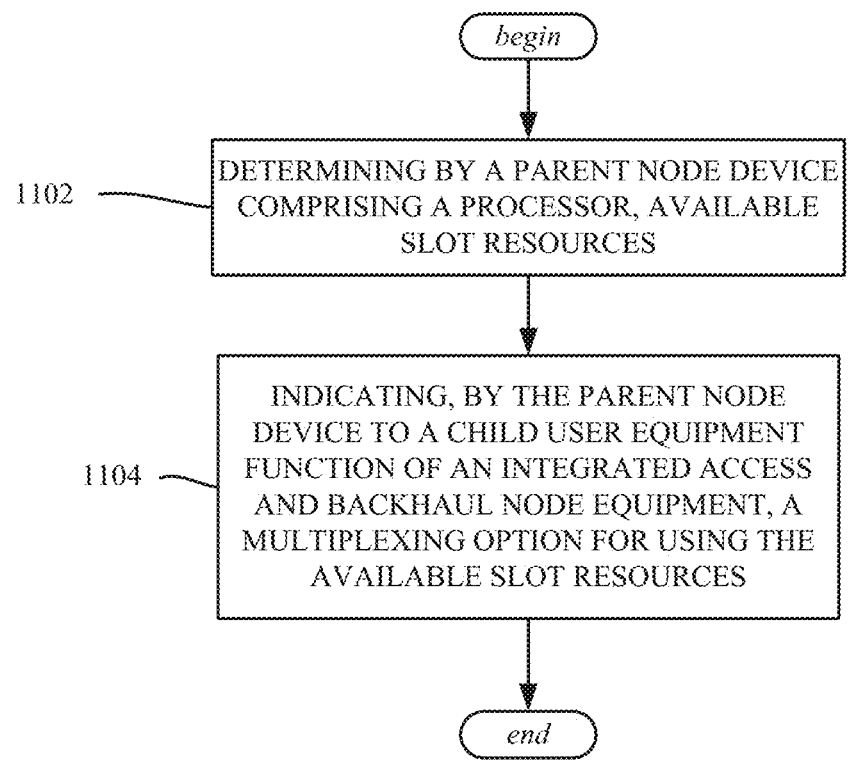
FIG. 11 is a flow diagram showing example operations related to determining available slot resources by a parent node, and indicating a multiplexing option to a child node for using the available slot resources, in accordance with various aspects and embodiments of the subject disclosure.

One or more aspects are represented in FIG. 11, and can comprise example operations, such as of a method. Operation 1102 represents determining, by a parent node device comprising a processor, available slot resources. Operation 1104 represents indicating, from the parent node device to a child user equipment function of an integrated access and backhaul node equipment, a multiplexing option for using the available slot resources.

The multiplexing option can correspond to a slot and can indicate that only the child user equipment function or a child distributed unit function is operable in the slot.

The multiplexing option can correspond to a slot and can indicate that the child user equipment function and a child distributed unit function is operable using spatial multiplexing in the slot.

The multiplexing option can correspond to a slot and can indicate that the child user equipment function and a child distributed unit function are capable of using full duplex operation in the slot.

The multiplexing option can be a first multiplexing option corresponding to a first slot; aspects can comprise, indicating, from the parent node device to the child user equipment function of the integrated access and backhaul node equipment, a second multiplexing option for using a second slot. The first multiplexing option for using the first slot and the second multiplexing option for using the second slot can be sent in a single message to the child user equipment function of the integrated access and backhaul node equipment.

Indicating, from the parent node device to the child user equipment function of the integrated access and backhaul node device, can occur in response to a request from the child user equipment function of the integrated access and backhaul node equipment.

Figure 12:
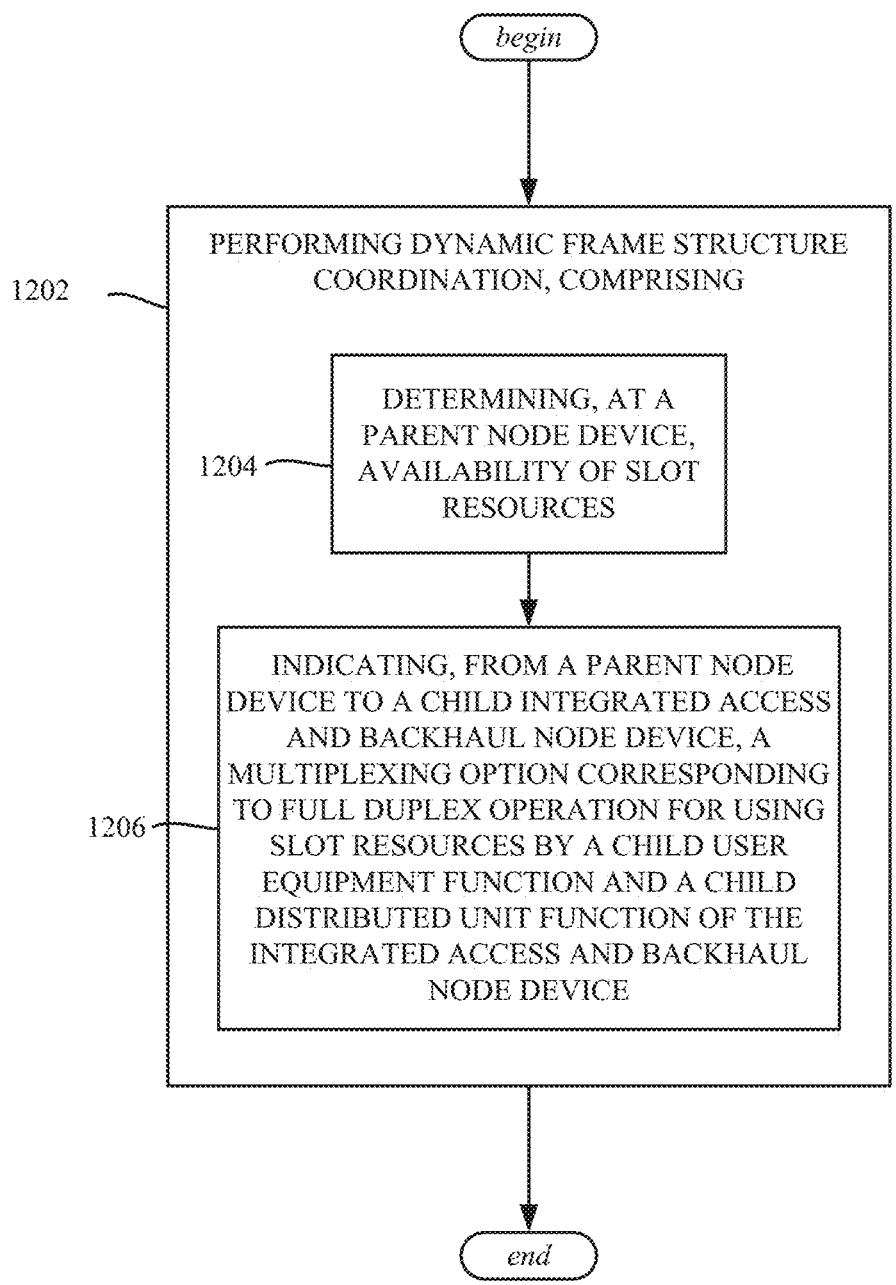
FIG. 12 is a flow diagram showing example operations related to performing dynamic frame structure coordination between a parent IAB node device and child IAB node device, in accordance with various aspects and embodiments of the subject disclosure.

The multiplexing option can correspond to a slot, and can indicate that the parent node is to be downlink transmitting in the slot or is to be uplink receiving in the slot, and can indicate whether a child distributed unit function is allowed to downlink transmit in the slot, uplink receive in the slot, or is not allowed to transmit or receive in the slot One or more aspects are represented in FIG. 12, and can comprise example operations, such as via a processor and a memory that stores executable instructions that, when executed by the processor, facilitate performance of the example operations. Operation 1202 represents performing dynamic frame structure coordination, comprising determining, at a parent node device, availability of slot resources (operation 1204) and indicating, from the parent node device to a child integrated access and backhaul node device, a multiplexing option corresponding to full duplex operation for using slot resources by a child user equipment function and a child distributed unit function of the integrated access and backhaul node device (operation 1206).

The dynamic frame structure coordination can modify a semi-static frame structure configuration.

The dynamic frame structure coordination can be set for a time period.

The dynamic frame structure coordination can be set for an indicated frequency resource.

Indicating, from the parent node device to the child integrated access and backhaul node device, can occur in response to a request from the child integrated access and backhaul node device.

The multiplexing option can correspond to half-duplex operation, full duplex operation, spatial division multiplexing or frequency division multiplexing.

The multiplexing option can be indicated in a dynamic frame structure coordination message comprising one or more multiplexing options and one or more slots identified in the dynamic frame structure coordination message.

Figure 13:
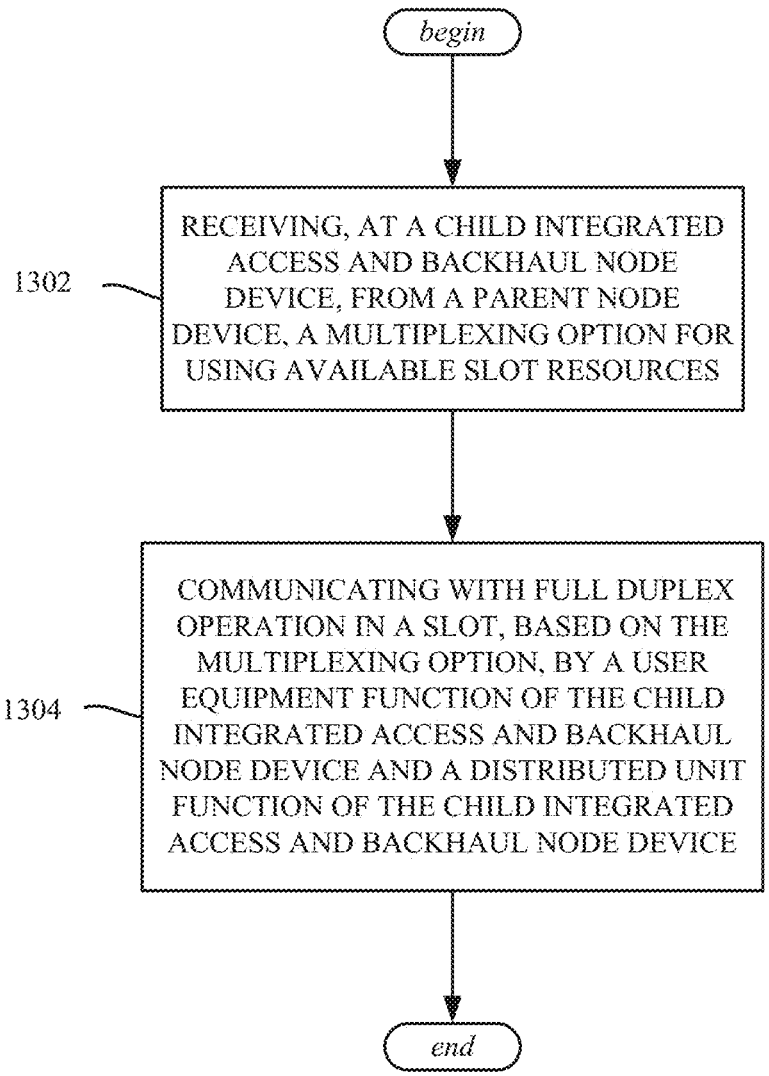
FIG. 13 is a flow diagram showing example operations related to receiving a multiplexing option at a child IAB node, and communicating based on the multiplexing option, in accordance with various aspects and embodiments of the subject disclosure.

One or more aspects are represented in FIG. 13, and can comprise example operations, such as of a machine-readable medium, comprising executable instructions that, when executed by a processor, facilitate performance of the example operations. Operation 1302 represents receiving, at a child integrated access and backhaul node device, from a parent node device, a multiplexing option for using available slot resources. Operation 1304 represents communicating with full duplex operation in a slot, based on the multiplexing option, by a user equipment function of the child integrated access and backhaul node device and a distributed unit function of the child integrated access and backhaul node device.

Further operations can comprise requesting, by the child integrated access and backhaul node device, the multiplexing option.

The multiplexing option can be a first multiplexing option corresponding to a first slot, and further operations can comprise can comprise, receiving, from the parent node device a second multiplexing option corresponding to a second slot.

Receiving the multiplexing option at the child integrated access and backhaul node device can comprise receiving the multiplexing option at a user equipment function of the child integrated access and backhaul node device, and further operations can comprise communicating data corresponding to the multiplexing option from the user equipment function to a distributed unit function of the child integrated access and backhaul node device.

Further operations can comprise scheduling communications, by the distributed unit function, based on the data corresponding to the multiplexing option.

As can be seen, the technology described herein supports flexible multiplexing of access and backhaul traffic across multiple hops of a wireless backhaul network beyond static capabilities. The technology facilitates efficient utilization of radio resources by enabling dynamic adaptation of available DL/UL resources for access and backhaul links between an IAB node and donor/parent IAB nodes based on the different multiplexing capabilities at a given IAB node. In this technology, the indication of available resources plus multiplexing capability can be used for slot, non-slot, and multi-slot scheduling. The technology allows flexible patterns of DL/UL resources and multiplexing operations to be coordinated across a backhaul link, including semi-persistent resource allocation.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 14:
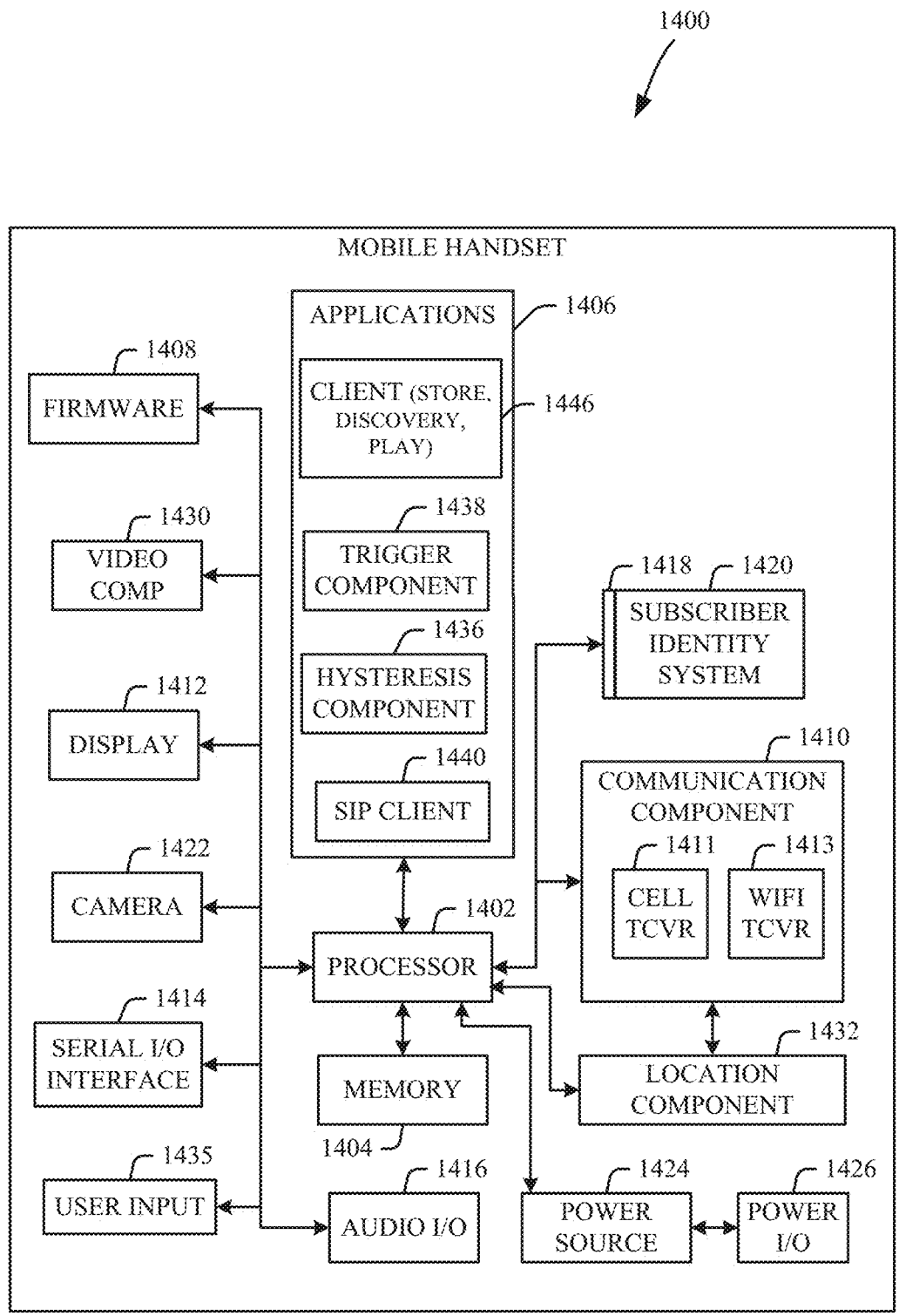
FIG. 14 illustrates an example block diagram of an example user equipment that can be a mobile handset in accordance with various aspects and embodiments of the subject disclosure.

Referring now to FIG. 14, illustrated is a schematic block diagram of an example end-user device such as a user equipment) that can be a mobile device 1400 capable of connecting to a network in accordance with some embodiments described herein. Although a mobile handset 1400 is illustrated herein, it will be understood that other devices can be a mobile device, and that the mobile handset 1400 is merely illustrated to provide context for the embodiments of the various embodiments described herein. The following discussion is intended to provide a brief, general description of an example of a suitable environment 1400 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1400 includes a processor 1402 for controlling and processing all onboard operations and functions. A memory 1404 interfaces to the processor 1402 for storage of data and one or more applications 1406 (e.g., a video player software, user feedback component software, etc.). Other applications can include voice recognition of predetermined voice commands that facilitate initiation of the user feedback signals. The applications 1406 can be stored in the memory 1404 and/or in a firmware 1408, and executed by the processor 1402 from either or both the memory 1404 or/and the firmware 1408. The firmware 1408 can also store startup code for execution in initializing the handset 1400. A communications component 1410 interfaces to the processor 1402 to facilitate wired/wireless communication with external systems, e.g., cellular networks, VoIP networks, and so on. Here, the communications component 1410 can also include a suitable cellular transceiver 1411 (e.g., a GSM transceiver) and/or an unlicensed transceiver 1413 (e.g., Wi-Fi, WiMax) for corresponding signal communications. The handset 1400 can be a device such as a cellular telephone, a PDA with mobile communications capabilities, and messaging-centric devices. The communications component 1410 also facilitates communications reception from terrestrial radio networks (e.g., broadcast), digital satellite radio networks, and Internet-based radio services networks.

The handset 1400 includes a display 1412 for displaying text, images, video, telephony functions (e.g., a Caller ID function), setup functions, and for user input. For example, the display 1412 can also be referred to as a "screen" that can accommodate the presentation of multimedia content (e.g., music metadata, messages, wallpaper, graphics, etc.). The display 1412 can also display videos and can facilitate the generation, editing and sharing of video quotes. A serial I/O interface 1414 is provided in communication with the processor 1402 to facilitate wired and/or wireless serial communications (e.g., USB, and/or IEEE 1494) through a hardwire connection, and other serial input devices (e.g., a keyboard, keypad, and mouse). This supports updating and troubleshooting the handset 1400, for example. Audio capabilities are provided with an audio I/O component 1416, which can include a speaker for the output of audio signals related to, for example, indication that the user pressed the proper key or key combination to initiate the user feedback signal. The audio I/O component 1416 also facilitates the input of audio signals through a microphone to record data and/or telephony voice data, and for inputting voice signals for telephone conversations.

The handset 1400 can include a slot interface 1418 for accommodating a SIC (Subscriber Identity Component) in the form factor of a card Subscriber Identity Module (SIM) or universal SIM 1420, and interfacing the SIM card 1420 with the processor 1402. However, it is to be appreciated that the SIM card 1420 can be manufactured into the handset 1400, and updated by downloading data and software.

The handset 1400 can process IP data traffic through the communication component 1410 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1422 (e.g., a camera) can be provided for decoding encoded multimedia content. The video processing component 1422 can aid in facilitating the generation, editing and sharing of video quotes. The handset 1400 also includes a power source 1424 in the form of batteries and/or an AC power subsystem, which power source 1424 can interface to an external power system or charging equipment (not shown) by a power I/O component 1426.

The handset 1400 can also include a video component 1430 for processing video content received and, for recording and transmitting video content. For example, the video component 1430 can facilitate the generation, editing and sharing of video quotes. A location tracking component 1432 facilitates geographically locating the handset 1400. As described hereinabove, this can occur when the user initiates the feedback signal automatically or manually. A user input component 1434 facilitates the user initiating the quality feedback signal. The user input component 1434 can also facilitate the generation, editing and sharing of video quotes. The user input component 1434 can include such conventional input device technologies such as a keypad, keyboard, mouse, stylus pen, and/or touch screen, for example.

Referring again to the applications 1406, a hysteresis component 1436 facilitates the analysis and processing of hysteresis data, which is utilized to determine when to associate with the access point. A software trigger component 1438 can be provided that facilitates triggering of the hysteresis component 1438 when the Wi-Fi transceiver 1413 detects the beacon of the access point. A SIP client 1440 enables the handset 1400 to support SIP protocols and register the subscriber with the SIP registrar server. The applications 1406 can also include a client 1442 that provides at least the capability of discovery, play and store of multimedia content, for example, music.

The handset 1400, as indicated above related to the communications component 810, includes an indoor network radio transceiver 1413 (e.g., Wi-Fi transceiver). This function supports the indoor radio link, such as IEEE 802.11, for the dual-mode GSM handset 1400. The handset 1400 can accommodate at least satellite radio services through a handset that can combine wireless voice and digital radio chipsets into a single handheld device.

Figure 15:
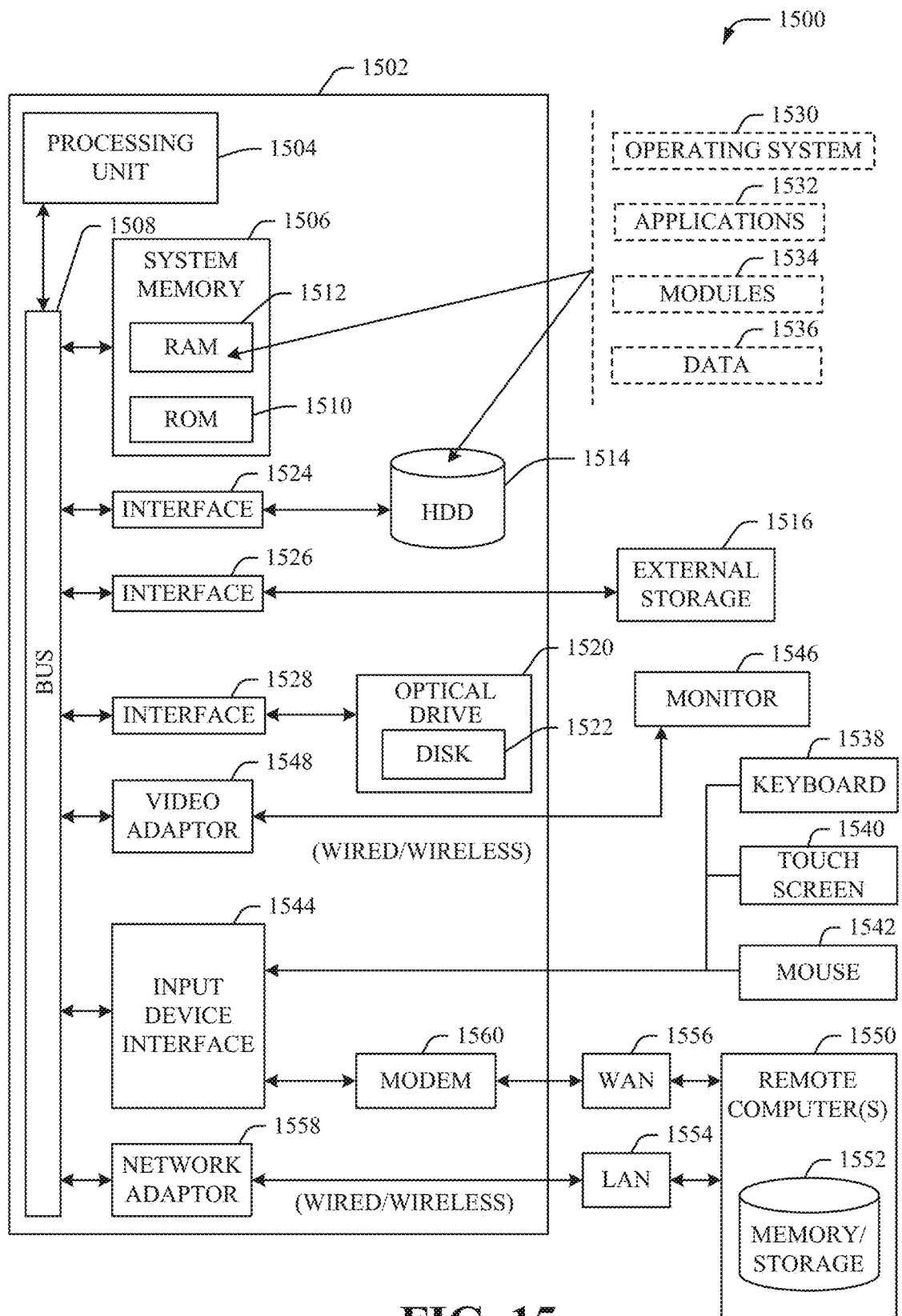
FIG. 15 illustrates an example block diagram of a computer that can be operable to execute processes and methods in accordance with various aspects and embodiments of the subject disclosure.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown).

Additionally, while not shown in environment 1500, a solid state drive (SSD), non-volatile memory and other storage technology could be used in addition to, or in place of, an HDD 1514, and can be internal or external. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1494 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally include emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can include one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1494 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 15 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:

determining, by a parent integrated access and backhaul node device comprising a processor, a group of network conditions of a mobile network associated with the parent integrated access and backhaul node device resulting in a first determination, wherein the determining of the group of network conditions comprises determining a group of reference signal received power (RSRP) measurements and a group of cross link interference (CLI) measurements;

determining, by the parent integrated access and backhaul node device, an integrated access and backhaul frame structure for an availability of a slot of slot resources of a backhaul link associated with the parent integrated access and backhaul node device and a child integrated access and backhaul node device resulting in a second determination, wherein the integrated access and backhaul frame structure comprises multiple slots including the slot of the slot resources;

based on the first determination and the second determination, determining, by the parent integrated access and backhaul node device, the availability of the slot of the slot resources of the backhaul link associated with the parent integrated access and backhaul node device and the child integrated access and backhaul node device resulting in a third determination;

based on the third determination, generating a radio resource control (RRC) message that includes an indication that jointly specifies the availability of the slot and a multiplexing option for using the slot by the child integrated access and backhaul node device; and transmitting, by the parent integrated access and backhaul node device to a user equipment function of the child integrated access and backhaul node device, the RRC message that includes the indication that jointly specifies the availability of the slot and the multiplexing option for using the slot by the child integrated access and backhaul node device.

2. The method of claim 1, wherein the multiplexing option indicates that only the user equipment function or a distributed unit function of the child integrated access and backhaul node device is operable in the slot.

3. The method of claim 1, wherein the multiplexing option corresponds to a slot and indicates that the user equipment function and a distributed unit function of the child integrated access and backhaul node device is operable using spatial multiplexing in the slot.

4. The method of claim 1, wherein the multiplexing option corresponds to a slot and indicates that the user equipment function and a distributed unit function of the child integrated access and backhaul node device is capable of using full duplex operation in the slot.

5. The method of claim 1, wherein the slot is a first slot, the indication is a first indication, and the multiplexing option is a first multiplexing option corresponding to the first slot, and further comprising, transmitting, by the parent integrated access and backhaul node device to the user equipment function of the child integrated access and backhaul node device, a second indication that jointly specifies an availability of a second slot of the slot resources and a second multiplexing option for using the second slot.

6. The method of claim 5, wherein the first indication and the second indication are sent in a single message to the user equipment function of the child integrated access and backhaul node device.

7. The method of claim 1, wherein the transmitting of the indication occurs in response to a request from the user equipment function of the child integrated access and backhaul node device.

8. The method of claim 1, wherein the multiplexing option indicates that the parent integrated access and backhaul node device is to be downlink transmitting in the slot or is to be uplink receiving in the slot, and indicates whether a distributed unit function is allowed to downlink transmit in the slot, uplink receive in the slot, or is not allowed to transmit or receive in the slot.

9. A parent integrated access and backhaul node device, comprising:
a processor; and
a memory that stores executable instructions that, when executed by the processor, facilitate performance of operations, the operations comprising:
determining a group of network conditions of a mobile network associated with the parent integrated access and backhaul node device resulting in a first determination, wherein the determining of the group of network conditions comprises determining a group of reference signal received power (RSRP) measurements and a group of cross link interference (CLI) measurements;
determining an integrated access and backhaul frame structure for an availability of a slot of slot resources of a backhaul link associated with the parent integrated access and backhaul node device and a child integrated access and backhaul node device resulting in a second determination, wherein the integrated access and backhaul frame structure comprises multiple slots including the slot of the slot resources;
based on the first determination and the second determination, performing dynamic frame structure coordination, comprising:
determining the availability of the slot of the slot resources of the backhaul link associated with the parent integrated access and backhaul node device and the child integrated access and backhaul node device resulting in a third determination;
based on the third determination, generating a radio resource control (RRC) message that includes an indication that jointly specifies the availability of the slot and a multiplexing option for using the slot by the child integrated access and backhaul node device; and
communicating, to the child integrated access and backhaul node device, the RRC message that includes the indication that jointly specifies the availability of the slot and the multiplexing option for using the slot by a user equipment function and a distributed unit function of the child integrated access and backhaul node device.

10. The parent integrated access and backhaul node device of claim 9, wherein the dynamic frame structure coordination modifies a semi-static frame structure configuration.

11. The parent integrated access and backhaul node device of claim 9, wherein the dynamic frame structure coordination is set for a time period.

12. The parent integrated access and backhaul node device of claim 9, wherein the dynamic frame structure coordination is set for an indicated frequency resource.

13. The parent integrated access and backhaul node device of claim 9, wherein the communicating of the indication occurs in response to a request from the child integrated access and backhaul node device.

14. The parent integrated access and backhaul node device of claim 9, wherein the multiplexing option corresponds to half-duplex operation, full duplex operation, spatial division multiplexing, or frequency division multiplexing.

15. The parent integrated access and backhaul node device of claim 9, wherein the indication is indicated in a dynamic frame structure coordination message comprising one or more multiplexing options and one or more slots identified in the dynamic frame structure coordination message.

16. A non-transitory machine-readable medium, comprising executable instructions that, when executed by a processor of a child integrated access and backhaul node device, facilitate performance of operations, the operations comprising:
receiving, from a parent integrated access and backhaul node device, a radio resource control (RRC) message that includes an indication that jointly specifies an availability of a slot of slot resources of a backhaul link and a multiplexing option for using the slot by the child integrated access and backhaul node device, wherein the backhaul link is associated with the parent integrated access and backhaul node device and the child integrated access and backhaul node device, wherein the parent integrated access and backhaul node device determines a group of network conditions of a mobile network associated with the parent integrated access and backhaul node device resulting in a first determination, wherein determining of the group of network conditions comprises determining a group of reference signal received power (RSRP) measurements and a group of cross link interference (CLI) measurements, wherein the parent integrated access and backhaul node device determines an integrated access and backhaul frame structure for an availability of the slot resulting in a second determination, wherein the integrated access and backhaul frame structure comprises multiple slots including the slot of the slot resources, wherein the parent integrated access and backhaul node device determines the availability of the slot based on the first determination and the second determination resulting in a third determination, the parent integrated access and backhaul node device generates the RRC message that includes the indication that jointly specifies the availability of the slot and the multiplexing option for using the slot by the child integrated access and backhaul node device based on the third determination, wherein the parent integrated access and backhaul node device transmits the RRC message that includes the indication based on the first determination and the second determination; and communicating with full duplex operation in the slot, based on the multiplexing option, by a user equipment function of the child integrated access and backhaul node device and a distributed unit function of the child integrated access and backhaul node device.

17. The non-transitory machine-readable medium of claim 16, wherein the operations further comprise requesting, by the child integrated access and backhaul node device, the multiplexing option.

18. The non-transitory machine-readable medium of claim 16, wherein the slot is a first slot, the indication is a first indication, and the multiplexing option is a first multiplexing option corresponding to the first slot, and wherein the operations further comprise receiving, from the parent integrated access and backhaul node device, second indication that jointly specifies an availability of a second slot and a second multiplexing option for using the second slot by the child integrated access and backhaul node device.

19. The non-transitory machine-readable medium of claim 16, wherein the receiving of the indication comprises receiving the indication at a user equipment function of the child integrated access and backhaul node device, and wherein the operations further comprise communicating first data corresponding to the indication from the user equipment function to the distributed unit function of the child integrated access and backhaul node device.

20. The non-transitory machine-readable medium of claim 16, wherein the operations further comprise scheduling communications, by the distributed unit function, based on second data corresponding to the indication.

* * * * *